United States Patent [19]
Littlejohn

[11] Patent Number: 6,121,609
[45] Date of Patent: Sep. 19, 2000

[54] PULSED MASS SPECTROMETER LEAK VALVE WITH CONTROLLED ENERGY CLOSURE

[75] Inventor: Duane P. Littlejohn, Manlius, N.Y.

[73] Assignee: Siemens Aktiengesellschaft, Munich, Germany

[21] Appl. No.: 09/173,913

[22] Filed: Oct. 16, 1998

[51] Int. Cl.[7] .......................... B01D 59/44; H01J 49/00
[52] U.S. Cl. ........................................ 250/288; 250/282
[58] Field of Search .................... 250/281, 282, 250/288

[56] References Cited

U.S. PATENT DOCUMENTS

| | | | |
|---|---|---|---|
| Re. 33,863 | 3/1992 | Bowman et al. | 250/288 |
| 3,586,027 | 6/1971 | Fitzgerald et al. | 137/87 |
| 3,895,231 | 7/1975 | Sodal et al. | 250/288 |
| 3,937,955 | 2/1976 | Comisarow et al. | 250/283 |
| 4,560,871 | 12/1985 | Bowman et al. | 250/288 |
| 4,879,458 | 11/1989 | Brunfeldt et al. | 250/281 |
| 5,019,139 | 5/1991 | Lapack et al. | 55/158 |
| 5,313,061 | 5/1994 | Drew et al. | 250/281 |
| 5,644,130 | 7/1997 | Raatz | 250/288 |
| 5,736,654 | 4/1998 | Dubois | 73/863.84 |

*Primary Examiner*—Bruce C. Anderson
*Attorney, Agent, or Firm*—J. Marc Asperas

[57] ABSTRACT

The closure of a leak valve in a pulsed mass spectrometer is controlled to thereby substantially extend the life of the valve. An actuator responds to a pulse to open the valve. At the end of the open period the element that closes the valve seat is allowed to travel a substantial distance from the open position of the element to the nearly closed position of the element. The pulse amplitude is then controlled so that the time for the element to travel the remaining distance to valve seat closure is extended in time. The pulse amplitude can also be controlled so that the valve will never close except under fault conditions where power is lost or in a non-operating mode.

14 Claims, 4 Drawing Sheets

PULSED MASS SPECTROMETER LEAK VALVE WITH CONTROLLED ENERGY CLOSURE

FIELD OF THE INVENTION

This invention relates to a mass spectrometer (MS) which uses the Fourier transform ion cyclotron resonance (FTICR) technique to determine the mass of ions and more particularly to operation of the pulsed sampling valve used therein for sample acquisition in a manner that results in dramatically increased valve lifetimes required for high speed, high reliability monitoring applications of mass spectrometers.

DESCRIPTION OF THE PRIOR ART

When a gas phase ion at low pressure is subjected to a uniform static magnetic field, the resulting behavior of the ion is determined by the magnitude and orientation of the ion velocity with respect to the magnetic field. If the ion is at rest, or if the ion has only a velocity parallel to the applied field, the ion experiences no interaction with the field.

If there is a component of the ion velocity that is perpendicular to the applied field, the ion will experience a force that is perpendicular to both the velocity component and the applied field. This force results in a circular ion trajectory that is referred to as ion cyclotron motion. In the absence of any other forces on the ion, the angular frequency of this motion is a simple function of the ion charge, the ion mass, and the magnetic field strength:

$$\omega = qB/m \qquad \text{Eq. 1}$$

where: $\omega$=angular frequency (radians/second)
q=ion charge (coulombs)
B=magnetic field strength (tesla)
m=ion mass (kilograms)

The FTICR MS exploits the fundamental relationship described in Equation 1 to determine the mass of ions by inducing large amplitude cyclotron motion and then determining the frequency of the motion. The first use of the Fourier transform in an ion cyclotron resonance mass spectrometer is described in U.S. Pat. No. 3,937,955 entitled "Fourier Transform Ion Cyclotron Resonance Spectroscopy Method And Apparatus" issued to M. B. Comisarow and A. G. Marshall on Feb. 10, 1976.

The ions to be analyzed are first introduced to the magnetic field with minimal perpendicular (radial) velocity and dispersion. The cyclotron motion induced by the magnetic field effects radial confinement of the ions; however, ion movement parallel to the axis of the field must be constrained by a pair of "trapping" electrodes. These electrodes typically consist of a pair of parallel-plates oriented perpendicular to the magnetic axis and disposed on opposite ends of the axial dimension of initial ion population. These trapping electrodes are maintained at a potential that is of the same sign as the charge of the ions and of sufficient magnitude to effect axial confinement of the ions between the electrode pair.

The trapped ions are then exposed to an electric field that is perpendicular to the magnetic field and oscillates at the cyclotron frequency of the ions to be analyzed. Such a field is typically created by applying appropriate differential potentials to a second pair of parallel-plate "excite" electrodes oriented parallel to the magnetic axis and disposed on opposing sides of the radial dimension of the initial ion population.

If ions of more than one mass are to be analyzed, the frequency of the oscillating field may be swept over an appropriate range, or be comprised of an appropriate mix of individual frequency components. When the frequency of the oscillating field matches the cyclotron frequency for a given ion mass, all of the ions of that mass will experience resonant acceleration by the electric field and the radius of their cyclotron motion will increase.

An important feature of this resonant acceleration is that the initial radial dispersion of the ions is essentially unchanged. The excited ions will remain grouped together on the circumference of the new cyclotron orbit, and to the extent that the dispersion is small relative to the new cyclotron radius, their motion will be mutually in phase or coherent. If the initial ion population consisted of ions of more than one mass, the acceleration process will result in a multiple isomass ion bundles, each orbiting at its respective cyclotron frequency.

The acceleration is continued until the radius of the cyclotron orbit brings the ions near enough to one or more detection electrodes to result in a detectable image charge being induced on the electrodes. Typically these "detect" electrodes will consist of a third pair of parallel-plate electrodes disposed on opposing sides of the radial dimension of the initial ion population and oriented perpendicular to both the excite and trap electrodes. Thus the three pairs of parallel-plate electrodes employed for ion trapping, excitation, and detection are mutually perpendicular and together form a closed box-like structure referred to as a trapped ion cell. FIG. 1 shows a simplified diagram for a trapped ion cell 12 having trap electrodes 12a and 12b; excite electrodes 12c and 12d; and detect electrodes 12e and 12f.

As the coherent cyclotron motion within the cell causes each isomass bundle of ions to alternately approach and recede from a detection electrode 12e, 12f, the image charge on the detection electrode correspondingly increases and decreases. If the detection electrodes 12e, 12f are made part of an external amplifier circuit (not shown), the alternating image charge will result in a sinusoidal current flow in the external circuit. The amplitude of the current is proportional to the total charge of the orbiting ion bundle and is thus indicative of the number of ions present. This current is amplified and digitized, and the frequency data is extracted by means of the Fourier transform. Finally, the resulting frequency spectrum is converted to a mass spectrum using the relationship in Equation 1.

Referring now to FIG. 2, there is shown a general implementation of a FTICR MS 10. The FTICR MS 10 consists of seven major subsystems necessary to perform the analytical sequence described above. The trapped ion cell 12 is contained within a vacuum system 14 comprised of a chamber 14a evacuated by an appropriate pumping device 14b. The chamber is situated within a magnet structure 16 that imposes a homogeneous static magnetic field over the dimension of the trapped ion cell 12. While magnet structure 16 is shown in FIG. 2 as a permanent magnet, a superconducting magnet may also be used to provide the magnetic field.

Pumping device 14b may be an ion pump which is an integral part of the vacuum chamber 14a. Such an ion pump then uses the same magnetic field from magnet structure 16 as is used by the trapped ion cell 12. An advantage of using an integral ion pump for pumping device 14b is that the integral ion pump eliminates the need for vacuum flanges that add significantly to the volume of gas that must be pumped and to the weight and cost of the FTICR MS. One example of a mass spectrometer having an integral ion pump is described in U.S. Pat. No. 5,313,061.

The sample to be analyzed is admitted to the vacuum chamber 14a by a sample introduction system 18 that may, for example, consist of a leak valve or gas chromatograph column. The sample molecules are converted to charged species within the trapped ion cell 12 by means of an ionizer 20 which typically consists of a gated electron beam passing through the cell 12, but may consist of a photon source or other means of ionization. Alternatively, the sample molecules may be created external to the vacuum chamber 14a by any one of many different techniques, and then injected along the magnetic field axis into the chamber 14a and trapped ion cell 12.

The various electronic circuits necessary to effect the trapped ion cell events described above are contained within an electronics package 22 which is controlled by a computer based data system 24. This data system 24 is also employed to perform reduction, manipulation, display, and communication of the acquired signal data.

The FTICR MS 10 needs an ultra high vacuum to operate. The sensitivity of the FTICR MS 10 is such that an extremely small amount of the sample is required for a complete analysis. As was described above, the sample introduction system may consist of a leak valve. One example of such a valve is disclosed in U.S. Pat. No. 3,895,231 ("the '231 patent") which issued on Jul. 15, 1975. The valve of the '231 patent includes a diamond tipped or steel needle that closes the gas flow path.

Another example of such a valve is shown in U.S. Pat. No. 4,560,871. The valve shown therein has a ball that closes the gas flow path. The ball is lifted from the seat to admit gas into the vacuum chamber by a piezo electric device. When the voltage to the piezo electric device is removed the valve closes. The velocity and therefore the energy at which the ball strikes the seat upon closure of the valve determines the wear rate and thus the lifetime of the valve.

The lifetimes of such valves have typically been less than a million operations before failure. Therefore, a drawback of the prior art valve is that it will have a relatively short lifetime in a FTICR MS which has a relatively high sampling rate, for example, 10 samples per second. At such a sampling rate, the FTICR MS will take in over 800,000 samples per day into vacuum chamber 14. Thus, a FTICR MS which uses the prior art valve and has such a daily sampling rate would have to have its leak valve replaced on an almost daily basis.

SUMMARY OF THE INVENTION

The present invention is an apparatus that controls the operation of a valve system that includes a portion of a mass spectrometer. The apparatus includes an electrically actuated force transfer element that when actuated opens the valve system. The apparatus also includes another force transfer element that closes the valve system when the electrically actuated force transfer element is no longer actuated. The apparatus further includes a force receiving element that is in operative association with both the electrically actuated and the another force transfer elements.

The valve system includes a portion of a mass spectrometer that is operatively associated with the force receiving element. The operation of the valve system is controlled by the force receiving element. The valve system controls the flow of fluid into an ionization chamber of said mass spectrometer.

The apparatus also further includes a circuit that provides a signal that rapidly changes from a first predetermined amplitude to a second predetermined amplitude to actuate the electrically actuated force transfer element. The circuit provides the signal initially with an amplitude that rapidly changes from the second predetermined amplitude towards the first predetermined amplitude to a third predetermined amplitude which is not equal to the first predetermined amplitude when it is desired to terminate the electrically actuated force transfer element actuation. The circuit provides the signal thereafter with an amplitude that is controlled to slowly change from the third predetermined amplitude to the first predetermined amplitude to thereby allow the mechanically actuated force element to close the valve system.

The present invention is also an apparatus for controlling the operation of a valve system that includes a portion of a mass spectrometer that is embodied as described above except that the circuit provides the signal after the amplitude has rapidly changed to the third predetermined amplitude with an amplitude that is controlled to slowly change from the third predetermined amplitude to a fourth predetermined amplitude which is not equal to the first predetermined amplitude to thereby allowing the electrically actuated force element to maintain the valve system in an almost closed position.

The present invention is a method for controlling the operation of a valve system that includes a portion of a mass spectrometer. The method includes the step of providing an electrically actuated force transfer element that when actuated opens the valve system. The method also includes the step of providing another force transfer element that closes the valve system when the electrically actuated force transfer element is no longer actuated. The method further includes the step of delivering a force to a force receiving element that is in operative association with both the electrically actuated and the another force transfer elements.

The valve system includes a portion of a mass spectrometer operatively associated with the force receiving element. The operation of the valve system is controlled by the force receiving element. The valve system controls the flow of fluid into an ionization chamber of the mass spectrometer.

The method further also includes the step of providing a signal that rapidly changes from a first predetermined amplitude to a second predetermined amplitude to actuate the electrically actuated force transfer element. The signal is initially provided with an amplitude that rapidly changes from the second predetermined amplitude towards the first predetermined amplitude to a third predetermined amplitude which is not equal to the first predetermined amplitude when it is desired to terminate the electrically actuated force transfer element actuation. Thereafter the signal is provided with an amplitude that is controlled to slowly change from the third predetermined amplitude to said first predetermined amplitude to thereby allow the mechanically actuated force element to close the valve system.

The present is also a method for controlling the operation of a valve system that includes a portion of a mass spectrometer that has the steps described above except that the signal is provided with after the amplitude has rapidly changed to the third predetermined amplitude with an amplitude that is controlled to slowly change from the third predetermined amplitude to a fourth predetermined amplitude which is not equal to the first predetermined amplitude to thereby allowing the electrically actuated force element to maintain the valve system in an almost closed position.

DESCRIPTION OF THE PREFERRED EMBODIMENT(S)

Figure 1:
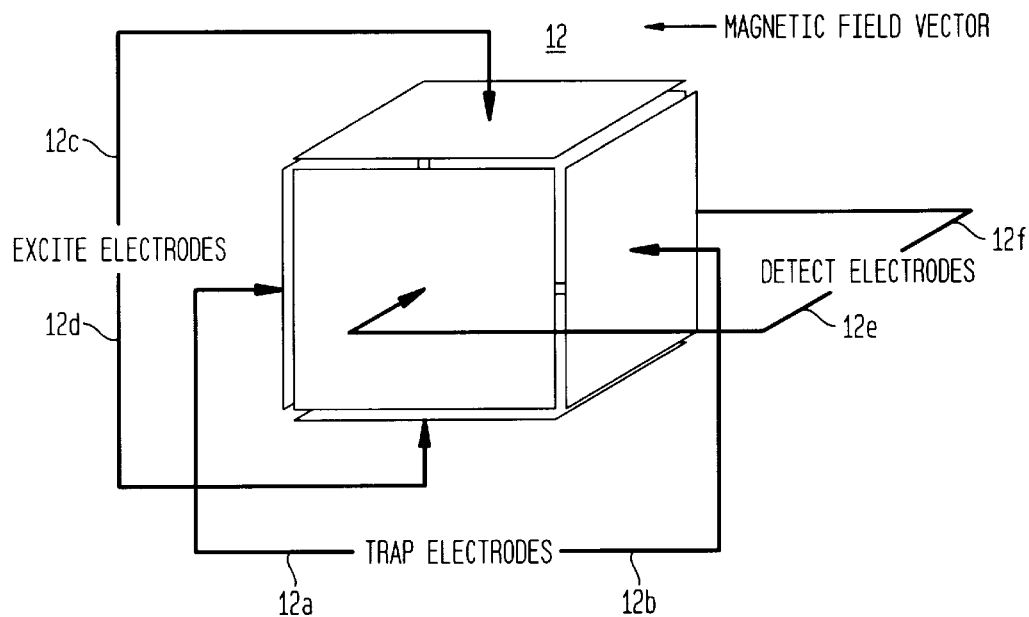
FIG. 1 shows a simplified diagram for a trapped ion cell.
Figure 2:
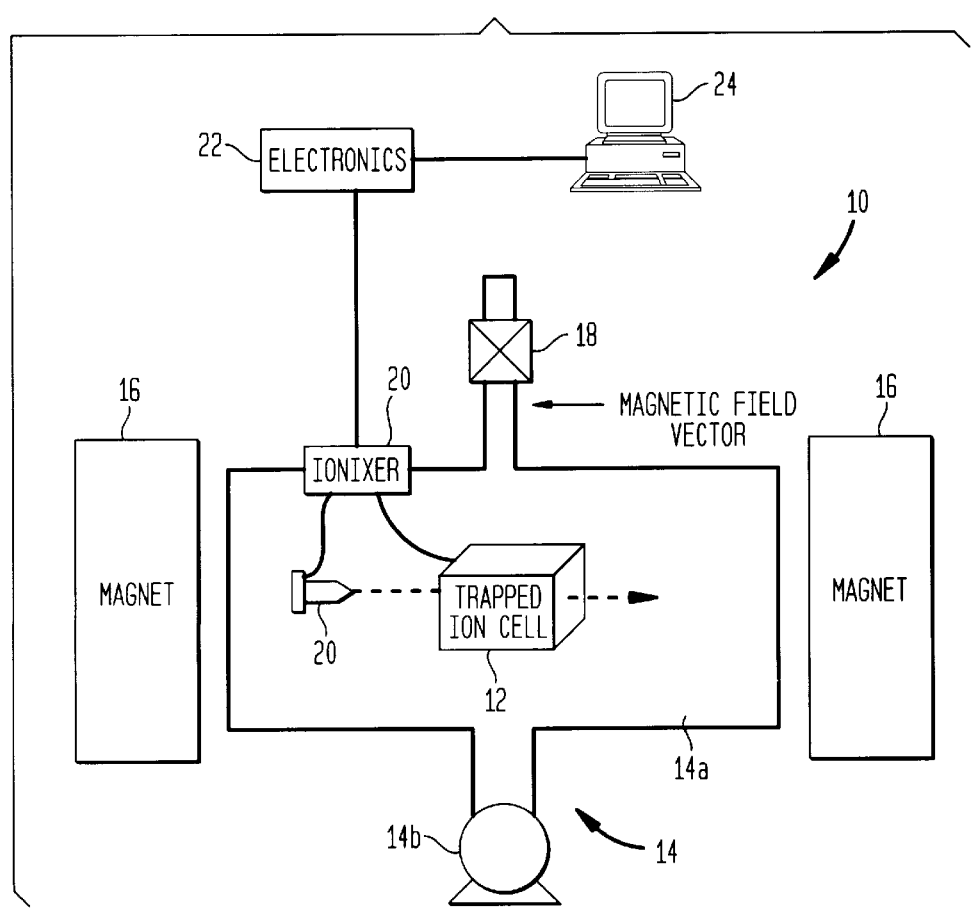
FIG. 2 shows a block diagram of a typical FTICR MS.
Figure 3:
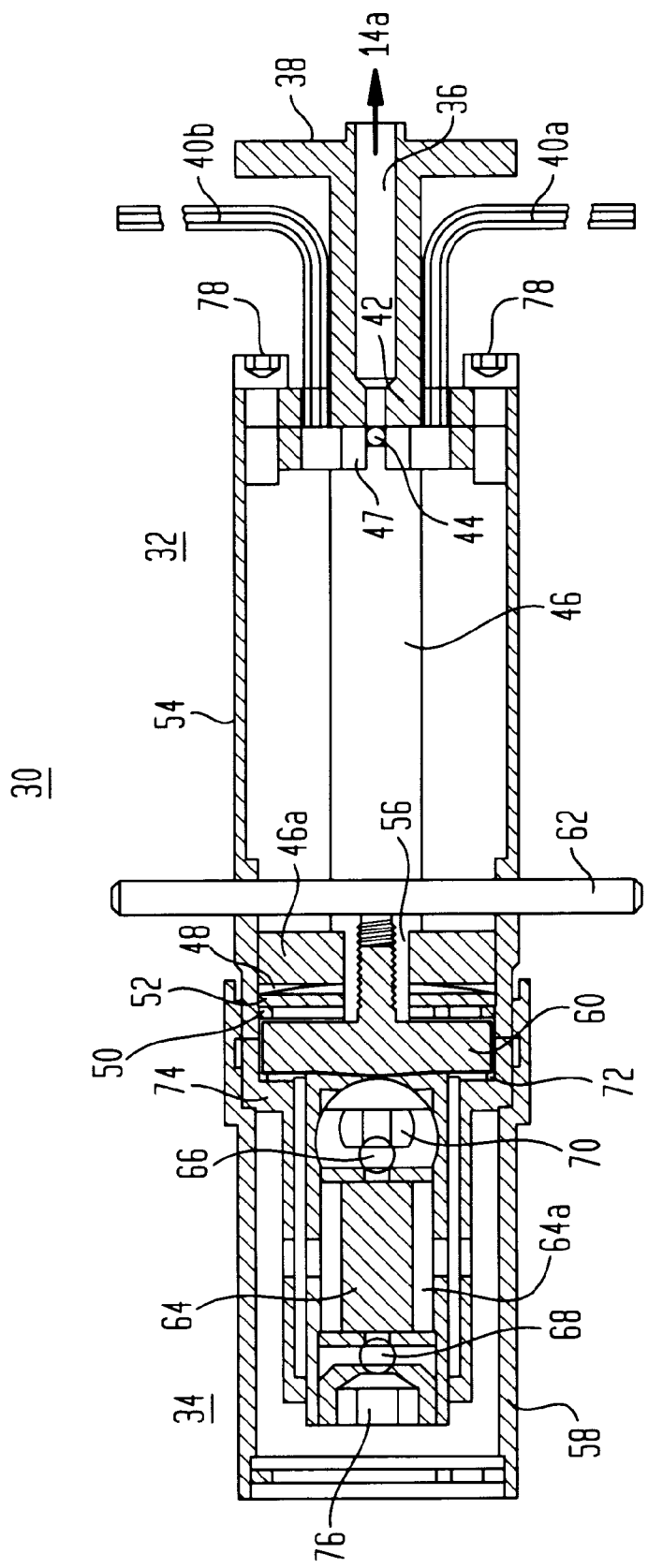
FIG. 3 shows a partial cross section through a leak valve.

Referring now to FIG. 3, there is shown a partial cross section of a valve 30. Valve 30 is the combination of valve subassembly 32 and actuator subassembly 34. Valve 30 includes in valve subassembly 32 a passageway 36 for introduction of the sample into the vacuum chamber of the FTICR MS. Valve 30 further includes in valve subassembly 32 a valve seat support structure 38 which defines passageway 36. Passageway 36 is in fluid contact with first and second sample tubes 40a, 40b by way of the seat 42 and ball 44.

The top portion of passageway 36 has an opening or valve seat 42 which is formed in valve seat support structure 38. The valve seat 42 is selectively closed and opened by closure component 44 which as is shown in FIG. 3 is in the form of a ceramic ball or sphere. The valve subassembly 32 further includes valve plunger 46 one end of which is in interference fit with ball 44. Plunger 46 and closure component 44 are both co-axially aligned with the central axis of passageway 36.

The valve subassembly 32 also further includes a spring 48 which provides a pre-load force to thereby cause ball 44 to form the valve seat 42 and to maintain the vacuum seal when valve 30 is assembled. When valve 30 is assembled, pre-load spring 48 is held in place between a flange 46a on plunger 46 and a retaining ring 50. A spring spacer 52 is between pre-load spring 48 and retaining ring 50. All of the parts of valve subassembly 32 are contained in valve body 54.

As can be seen from FIG. 3, the end of plunger 42 adjacent flange 46a has therein threads 56 as does the outer edge of valve body 54 adjacent actuator subassembly 34. Actuator subassembly 34 has a cover 58 which has threads complementary to those in the outer edge of valve body 54 and a plunger driver 60 which has threads complementary to the threads in the plunger 42. When valve 30 is assembled, the actuator subassembly 34 is brought into contact with valve subassembly 32 in a manner such that the threads on cover 58 mate with the threads on valve body 54 and the threads on plunger driver 60 mate with the complementary threads in plunger 46. The subassembly 34 is then screwed onto subassembly 32. Valve 30 further includes a pin 62 which is held in a vise when subassembly 34 is screwed onto subassembly 32 to thereby keep ball 44 from rotating in seat 42 during the assembly operation. Pin 62 is removed once the assembly of valve 30 is completed.

In addition to plunger driver 60, actuator device 34 also includes a piezoelectric actuator 64 one end of which is in contact with a ball 66 and the other end of which is in contact with a ball 68. Ball 66 is in contact with one end of an actuator bridge pin 70. The other end of pin 70 is in contact with piezoelectric return spring 72. Spring 72 is captured between plunger driver 60 and actuator base 74.

Actuator 64 is captured between balls 66 and 68 and pre-load screw 76 in cylindrical cavity 60a of plunger driver 60. The pre-load screw 76 functions to adjust the space between actuator 64 and balls 66 and 68. Actuator cover 58 encloses actuator 64, balls 66 and 68, actuator bridge pin 70, spring 72, actuator base 74 and pre-load screw 76. Cover 58 is enclosed at its open end by a suitable closing means.

As is well known, when piezoelectric actuator 64 is energized by an electrical signal (the leads connecting the signal to actuator 64 have been omitted in FIG. 3), the actuator is actuated to increase in length thereby drawing plunger driver 60 towards pre-load screw 76. Since driver 60 is connected to valve plunger 46, the movement of driver 60 towards screw 76 causes valve plunger 46 to also move towards the screw. Ball 44 is interference fit in membrane structure 47 and to plunger 46 and therefore the ball 44 moves towards the screw 76. Thus the ball 44 is lifted from valve seat 42 thereby providing an opening to passageway 36 from sample tubes 40a and 40b for gas sample to enter passageway 36 to the FTICR MS vacuum chamber 14a.

Upon the end of the electrical signal, the pre-load spring 48 and spring 72 acting together cause the piezoelectric actuator 64 and therefore the plunger driver 60 and valve plunger 46 and thus ball 44 to return to the position those elements had before the actuator 64 received the electrical signal. Therefore, upon the end of the electrical signal the ball 44 will return to valve seat 42 to thereby close passageway 36.

Figure 4:
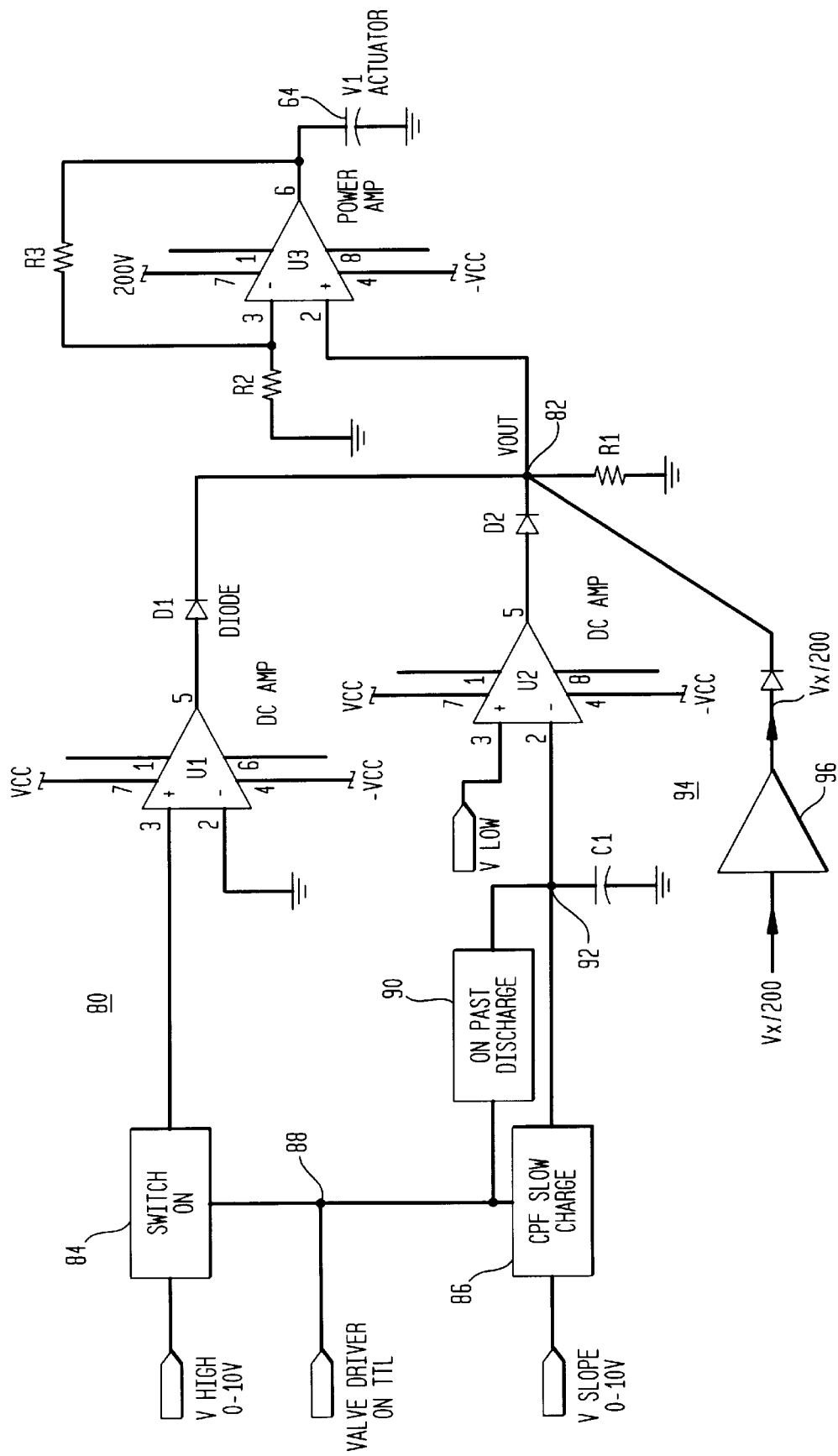
FIG. 4 shows a simplified schematic-block diagram of the driver circuit for the leak valve.

Referring now to FIG. 4, there is shown a simplified schematic-block diagram for the driver 80 for piezo electric actuator 64. The actuator 64 is shown in FIG. 4 as a capacitor. Driver 80 includes first and second DC amplifiers U1 and U2 whose outputs are each connected by an associated one of diodes D1 and D2 to a junction 82. Junction 82 is connected to ground through a resistor R1 and to the noninverting input of a power amplifier U3. The voltage at junction 82 is designated as "Vout."

Driver 80 also includes blocks 84 and 86. The input of block 84 is connected to a voltage labeled Vhigh, and the input of block 86 is connected to a voltage labeled Vslope. The output of block 84 is connected to the noninverting input of U1 and the output of block 86 is connected to the inverting input of U2. The inverting input of U1 is connected to ground and the noninverting input of U2 is connected to a voltage labeled Vlow.

A junction 88 is connected to both blocks 84 and 86 and to a voltage in the form of a TTL pulse labeled Valve Driver On. A block 90 is connected between junction 88 and a junction 92 which is connected to the inverting input of U2. Junction 92 is also connected to ground through a capacitor C1. The leading edge of Valve Driver On TTL pulse turns on block 84 which thereby causes the Vout pulse at junction 82 to have a peak voltage which is proportional to Vhigh.

The leading edge of the Valve Driver On TTL pulse also turns off the charging of capacitor C1 and turns on block 90 which causes a fast discharge of the capacitor. The discharge of capacitor C1 is sufficiently fast to reduce the voltage of the capacitor to zero volts before the end of the Valve Driver On TTL pulse. As the voltage of capacitor C1 drops to zero, the output of U2 rises to a voltage proportional to Vlow which is never higher than the output of U1.

The trailing edge of the Valve Driver ON TTL pulse turns off block 90 and turns on block 86. This allows the capacitor C1 to charge up to a value of +Vlow at a rate proportional to the voltage Vslope. The trailing edge of the Valve Driver On TTL pulse also turns off block 84 thereby causing Vout at junction 82 to drop to a lesser voltage which is proportional only to Vlow as the capacitor C1 had already been discharged to zero volts before the occurrence of the trailing edge of the TTL pulse.

As capacitor C1 charges up to +Vlow under the control of the voltage Vslope, the output of U2 decreases from Vlow to zero Volts. Likewise, Vout also decreases to zero Volts. The resistor R1 keep Vout from going below zero Volts. When capacitor voltage C1 reaches the voltage +Vlow, Vout is zero Volts. The capacitor C1 remains in the charge mode eventually attaining a voltage between Vlow and Vcc until the occurrence of the next Valve Driver On TTL pulse.

Junction 82 is connected to the noninverting input of a power amplifier U3. The inverting input of U3 is connected by a resistor R2 to ground and the output of U3 is connected to the piezo electric actuator 64. In one embodiment for driver 80 the gain of amplifier U3 was set at 200.

Figure 5A:
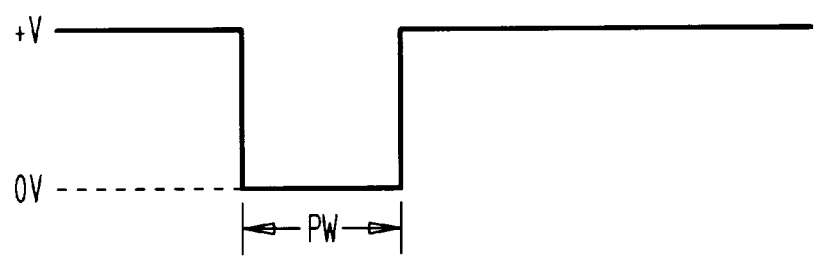
FIG. 5 shows the waveform at the output of the driver circuit and the waveform for the TTL pulse at the circuit input.
Figure 5B:
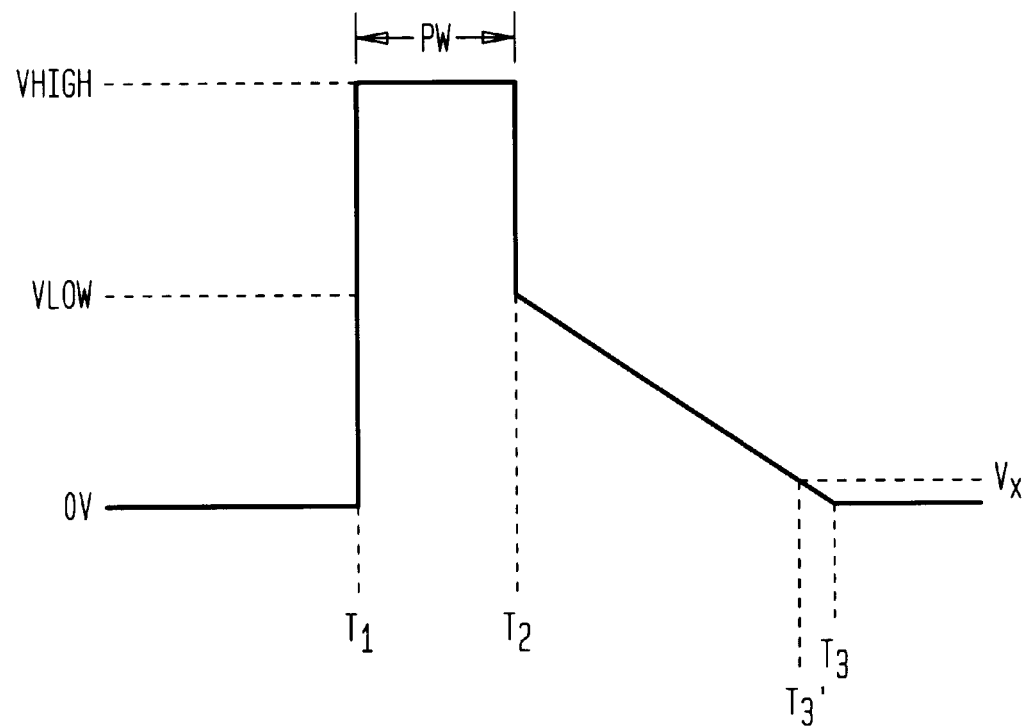

Referring now to FIGS. 5a and 5b, there is shown in FIG. 5a the Valve Driver On TTL pulse and in FIG. 5b the waveform for the voltage across the actuator 64. Upon the occurrence of the leading edge of the TTL pulse at time T1, the voltage across the actuator 64 rises very quickly to Vhigh. That voltage remains at Vhigh for the duration, PW, of the TTL pulse. During that time the piezo electric actuator 64 is actuated to open the passageway 36 and allow sample gas to enter the vacuum chamber.

At the end of the TTL pulse at time T2, the voltage across the actuator rapidly drops to Vlow. The ball 44 approaches seat 42 at a relatively high velocity during this rapid drop in the voltage across actuator 64. Once the voltage reaches Vlow Volts, the capacitor C1, which was discharged as a result of the occurrence of the leading edge of the TTL pulse, charges under the control of Vslope causing the voltage across capacitor C1 and thus the voltage to actuator 64 to slowly decrease to zero volts at time T3. It is this controlled decrease of the voltage across capacitor C1 and thus the voltage to actuator 64 from Vlow Volts to zero Volts which slows the velocity of the ball 44 to thereby extend the time for the ball 44 to travel the remaining distance to close seat 42. The voltages Vhigh, Vslope and Vlow are all software programmable in a manner well known to those of ordinary skill in the art.

In one embodiment for driver 80, the closing time for the last 10% of the travel of ball 44 was extended to 10 msec. which is 1000 times slower than the uncontrolled rate. The energy (E) is proportional to the square of the velocity. Therefore, the driver 80 of the present invention reduced the energy of closure by a factor of 1000 squared or 1,000,000 times less energy than the uncontrolled rate. A life test with a valve 30 operated in this mode has exceeded one (1) billion cycles with no sign of wear.

The valve 30 can also be controlled so that it does not quite close at the end of each sample actuation but instead only reduces the gas flow to a predetermined rate, for example, 1/10,000 th of the flow rate at the peak of the ample cycle. The residual sample flow in the partially pen position would introduce an error in measurement of no significance and operation in this mode would predict a lifetime approaching infinity. FIG. 4 shows circuit 94 having a DC amplifier 96 with a gain of one which will apply a software programmable voltage, Vx, that will establish the flow rate through the nearly closed valve 30. In this instance, the voltage across capacitor C1 and thus the voltage to actuator 64 decreases from Vlow Volts to Vx Volts at a time T3' as is shown in FIG. 5b by the dashed line. Of course, the valve will close under fault conditions where power is lost to reestablish the perfect vacuum seal.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. An apparatus for controlling the operation of a valve system that includes a portion of a mass spectrometer, comprising:
    a. an electrically actuated force transfer element that when actuated opens said valve system;
    b. another force transfer element that closes said valve system when said electrically actuated force transfer element is no longer actuated;
    c. a force receiving element that is in operative association with both said electrically actuated and said another force transfer elements, said valve system including a portion of a mass spectrometer operatively associated with said force receiving element, the operation of said valve system being controlled by said force receiving element, said valve system controlling the flow of fluid into an ionization chamber of said mass spectrometer; and
    d. a circuit for providing a signal that rapidly changes from a first predetermined amplitude to a second predetermined amplitude to actuate said electrically actuated force transfer element, said circuit providing said signal initially with an amplitude that rapidly changes from said second predetermined amplitude towards said first predetermined amplitude to a third predetermined amplitude which is not equal to said first predetermined amplitude when it is desired to terminate said electrically actuated force transfer element actuation and thereafter with an amplitude that is controlled to slowly change from said third predetermined amplitude to said first predetermined amplitude to thereby allow said another actuated force element to close said valve system.

2. The apparatus of claim 1 wherein said ionization chamber is a vacuum chamber.

3. The apparatus of claim 2 wherein said mass spectrometer has an ion pump integral with said vacuum chamber.

4. The apparatus of claim 1 wherein said mass spectrometer has an ion pump integral with said ionization chamber.

5. The apparatus of claim 1 wherein said force receiving element is in mechanical contact with both said electrically actuated and said another force transfer elements.

6. The apparatus of claim 1 wherein said another force transfer element is mechanically actuated.

7. An apparatus for controlling the operation of a valve system that includes a portion of a mass spectrometer, comprising:
    a. an electrically actuated force transfer element that when actuated opens said valve system;
    b. another force transfer element that closes said valve system when said electrically actuated force transfer element is no longer actuated;
    c. a force receiving element that is in operative association with both said electrically actuated and said another force transfer elements, said valve system including a portion of a mass spectrometer operatively associated with said force receiving element, the operation of said valve system being controlled by said force receiving element, said valve system controlling the flow of fluid into an ionization chamber of said mass spectrometer; and
    d. a circuit for providing a signal that rapidly changes from a first predetermined amplitude to a second predetermined amplitude to actuate said electrically actuated force transfer element, said circuit providing said signal initially with an amplitude that rapidly changes from said second predetermined amplitude towards said first predetermined amplitude to a third predetermined amplitude which is not equal to said first predetermined amplitude when it is desired to terminate said electrically actuated force transfer element actuation and thereafter with an amplitude that is controlled to slowly change from said third predetermined amplitude to a fourth predetermined amplitude which is not equal to said first predetermined amplitude to thereby allow said electrically actuated force element to maintain said valve system in an almost closed position.

8. The apparatus of claim 7 wherein said ionization chamber is a vacuum chamber.

9. The apparatus of claim 8 wherein said mass spectrometer has an ion pump integral with said vacuum chamber.

10. The apparatus of claim 7 wherein said mass spectrometer has an ion pump integral with said ionization chamber.

11. The apparatus of claim 7 wherein said another force transfer element is mechanically actuated.

12. The apparatus of claim 7 wherein said force receiving element is in mechanical contact with both said electrically actuated and said another force transfer elements.

13. A method for controlling the operation of a valve system that includes a portion of a mass spectrometer, comprising:
  a. providing an electrically actuated force transfer element that when actuated opens said valve system;
  b. providing another force transfer element that closes said valve system when said electrically actuated force transfer element is no longer actuated;
  c. delivering a force to a force receiving element that is in operative association with both said electrically actuated and said another force transfer elements, said valve system including a portion of a mass spectrometer operatively associated with said force receiving element, the operation of said valve system being controlled by said force receiving element, said valve system controlling the flow of fluid into an ionization chamber of said mass spectrometer; and
  d. providing a signal that rapidly changes from a first predetermined amplitude to a second predetermined amplitude to actuate said electrically actuated force transfer element, said signal provided initially with an amplitude that rapidly changes from said second predetermined amplitude towards said first predetermined amplitude to a third predetermined amplitude which is not equal to said first predetermined amplitude when it is desired to terminate said electrically actuated force transfer element actuation and thereafter with an amplitude that is controlled to change slowly from said third predetermined amplitude to said first predetermined amplitude to thereby allow said mechanically actuated force element to close said valve system.

14. A method for controlling the operation of a valve system that includes a portion of a mass spectrometer, comprising:
  a. providing an electrically actuated force transfer element that when actuated opens said valve system;
  b. providing another force transfer element that closes said valve system when said electrically actuated force transfer element is no longer actuated;
  c. delivering a force to a force receiving element that is in operative association with both said electrically actuated and said another force transfer elements, said valve system including a portion of a mass spectrometer operatively associated with said force receiving element, the operation of said valve system being controlled by said force receiving element, said valve system controlling the flow of fluid into an ionization chamber of said mass spectrometer; and
  d. providing a signal that rapidly changes from a first predetermined amplitude to a second predetermined amplitude to actuate said electrically actuated force transfer element, said circuit providing said signal initially with an amplitude that rapidly changes from said second predetermined amplitude towards said first predetermined amplitude to a third predetermined amplitude which is not equal to said first predetermined amplitude when it is desired to terminate said electrically actuated force transfer element actuation and thereafter with an amplitude that is controlled to slowly change from said third predetermined amplitude to a fourth predetermined amplitude which is not equal to said first predetermined amplitude to thereby allow said electrically actuated force element to maintain said valve system in an almost closed position.

\* \* \* \* \*